US011652658B2

(12) United States Patent
Pognant

(10) Patent No.: US 11,652,658 B2
(45) Date of Patent: May 16, 2023

(54) METHODS FOR CONFIGURING, MONITORING AND CONTROLLING AT LEAST ONE HOME AUTOMATION INSTALLATION OF A BUILDING

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 526 days.

(21) Appl. No.: 15/568,224

(22) PCT Filed: Apr. 20, 2016

(86) PCT No.: PCT/FR2016/050913
§ 371 (c)(1),
(2) Date: Dec. 10, 2018

(87) PCT Pub. No.: WO2016/170265
PCT Pub. Date: Oct. 27, 2016

(65) Prior Publication Data
US 2019/0097832 A1 Mar. 28, 2019

(30) Foreign Application Priority Data
Apr. 21, 2015 (FR) ...................... 1553539

(51) Int. Cl.
H04L 12/28 (2006.01)
H04L 41/084 (2022.01)
(Continued)

(52) U.S. Cl.
CPC ...... H04L 12/2825 (2013.01); H04L 12/2823 (2013.01); H04L 41/065 (2013.01);
(Continued)

(58) Field of Classification Search
CPC ............ H04L 12/2825; H04L 12/2823; H04L 41/065; H04L 41/0843; H04L 41/0893; H04L 43/0817
See application file for complete search history.

(56) References Cited

U.S. PATENT DOCUMENTS

2004/0133704 A1 7/2004 Krzyzanowski et al.
2004/0215694 A1 10/2004 Podolsky
(Continued)

FOREIGN PATENT DOCUMENTS

EP 1950911 A1 7/2008

OTHER PUBLICATIONS

International Search Report for International Application No. PCT/FR2016/050913.
(Continued)

Primary Examiner — Jason D Recek
(74) Attorney, Agent, or Firm — Cantor Colburn LLP

(57) ABSTRACT

The present invention relates to a method for configuring, a method for monitoring and a method for controlling at least one home-automation system of a building, said home-automation system comprising a plurality of home-automation devices, wherein each home-automation device is represented by at least one instance of a generic device model (GDM) and least one instance of a low-level device model (RDM), the method being executed by a CPU connected to the at least one home-automation system and comprising the following steps: determination of a status, model or control conversion that converts status, model or control variables between the low-level model and the generic model.

5 Claims, 6 Drawing Sheets

(51) Int. Cl.
*H04L 41/0893* (2022.01)
*H04L 41/0631* (2022.01)
*H04L 43/0817* (2022.01)

(52) U.S. Cl.
CPC ...... *H04L 41/0843* (2013.01); *H04L 41/0893* (2013.01); *H04L 43/0817* (2013.01)

(56) References Cited

U.S. PATENT DOCUMENTS

| | | | |
|---|---|---|---|
| 2011/0071656 A1* | 3/2011 | McKiel, Jr. | G06N 5/02 |
| | | | 700/90 |
| 2012/0011082 A1* | 1/2012 | Apte | G06F 30/3323 |
| | | | 706/12 |
| 2012/0303824 A1 | 11/2012 | Anderson et al. | |
| 2013/0086066 A1 | 4/2013 | Anderson, Jr. et al. | |
| 2015/0160623 A1* | 6/2015 | Holley | H04N 21/454 |
| | | | 700/90 |

OTHER PUBLICATIONS

Marc-Oliver Pahl et al.; "Knowledge-Based Middleware for Future Home Networks" Dec. 15, 2009; pp. 1-6.
Marc-Oliver Pahl et al.; "The Missing Layer-Virtualizing Smart Spaces" Mar. 1, 2013; pp. 139-144.

\* cited by examiner

METHODS FOR CONFIGURING, MONITORING AND CONTROLLING AT LEAST ONE HOME AUTOMATION INSTALLATION OF A BUILDING

CROSS REFERENCE TO RELATED APPLICATIONS

This application is a National Stage of PCT Application No. PCT/FR2016/050913 filed on Apr. 20, 2016, which claims priority to French Patent Application No. 15/53539 filed on Apr. 21, 2015, the contents each of which are incorporated herein by reference thereto.

TECHNICAL FIELD

The present invention concerns a method for configuring, controlling and/or monitoring a home automation installation.

BACKGROUND

It is known to proceed to the control and/or monitoring of a home automation installation via multiple communication protocols.

Thus, the non-exhaustive list of the protocols to consider for the control and/or monitoring of an installation comprises: Z-Wave, EnOcean, io-Homecontrol, Somfy RTS, KNX, MODBUS, Wavenis, Philips HUE as well as other proprietary protocols.

The commonly used protocols have considerable differences. In particular, the different protocols may provide mechanisms for logical partition of the devices which are different. Thus, a physical device with multiple functions may be modeled as a unique logical device or a plurality of logical devices.

Depending on its type, a device may be in different statuses. As an example, a status may correspond to ON or OFF for a switch, or an opening degree or percentage for a shutter. The description of the statuses of the devices may be generic or specialized, depending on the local protocol. The identifiers of the status variables may be numeric or alphanumeric. The values of the status variables may use customized or proprietary formats or scales.

The devices are capable of interpreting and executing commands. The description of the device commands may be generic or specialized, the identifiers of the commands being either numeric or alphanumeric. The commands may have parameters, whose values may use customized or proprietary formats or scales.

The used local communication protocols may be unidirectional, bidirectional in the form of a request/response exchange or a dual unidirectional exchange using an event-based approach. These protocols use a proprietary format, usually binary.

Thus, the lack of standardization in the local communication protocols of the devices makes difficult the remote control and the monitoring of heterogeneous home automation installations.

BRIEF SUMMARY

The present invention aims to solve all or part of the aforementioned drawbacks.

To this end, the present invention concerns a method for monitoring at least one home automation installation of a building, the home automation installation comprising a plurality of home automation devices, each home automation device being represented by at least one generic device model instance and at least one low-level device model instance; the method being executed by a management unit connected to the at least one home automation installation and comprising the following steps:

i. Reception of a status notification message coming from a central control unit of a home automation installation containing an indication regarding at least one low-level status variable of a home automation device;

ii. Determination of the at least one low-level device model instance representing the home automation device;

iii. Determination of a status conversion converting the at least one low-level status variable into at least one generic status variable on the basis of at least one status conversion rule selected according to the at least one low-level status variable or its type;

iv. Determination of the at least one generic device model instance for the at least one low-level device model instance determined at step v. Update of the at least one generic status variable of the at least one generic device model instance determined at step iv according to the status conversion determined at step iii.

It should be noted that step iii may be carried out before step ii or after step iv depending on the considered embodiments.

Thanks to the arrangements according to the invention, it is possible to proceed to a monitoring, in particular a remote monitoring, of the home automation installation in a uniform manner regardless of the local communication or control protocol used to monitor the home automation devices.

Thus, the generic device model is a model independent of the protocol allowing describing the devices of the building in a functional manner.

It should be noted that by home automation device is meant a home automation equipment and/or a sensor, or a portion of a home automation equipment or a portion of a sensor corresponding to a functional subset.

Moreover, by message is meant an information element notified or received in the form of a synchronous or asynchrony invocation to the management unit, which may also correspond to a local or remote invocation of a function.

According to an aspect of the invention, each generic device model instance comprises an indication on the belonging to a generic device model class or type.

According to an aspect of the invention, each low-level device model instance comprises an indication on the belonging to a low-level device model class or type.

According to an aspect of the invention, each low-level device model instance comprises an indication on a local communication protocol type recognized by the home automation device.

The processing of the information stored in this low-level model for a given device implies a knowledge of the particular protocol and of the data format for this device. According to an aspect of the invention, this model may have a common structure format for the different low-level devices types, but the types of the attributes, of the status variables and of the commands defined in this model are not generic.

The conversion between the generic model and the low-level model is operated on the basis of a set of predefined model conversion rules, which are in particular saved on the management unit and allow providing an abstraction of the devices for the applications or the users.

According to an aspect of the invention, the management unit is a server remotely connected to the at least one home automation installation, via a wide area network.

According to another aspect of the invention, the management unit is a central unit intended to be linked to one or several central control unit(s) on distinct private or local area networks, or on the same local area network.

According to an aspect of the invention, the selection of a status conversion rule according to the low-level status variable is carried out on the basis of the type of the status variable and on the low-level device type.

According to an aspect of the invention, the status conversion rules are stored in association with the following data:
- a generic variable identifier or name;
- a generic device type;
- a low-level variable identifier or name.

According to an aspect of the invention, a status conversion rule defines the correspondence between an identifier of a low-level status variable and an identifier of a generic status variable, as well as a conversion rule between the value of a low-level status variable and a value of a generic status variable.

According to an aspect of the invention, the method comprises a step of updating the value of the low-level status variable and storing this value.

According to an aspect of the invention, the generic device model instances are only partially memorized in a persistent manner. The values of the generic status variables are recalculated from the data of the low-level models instances on the basis of the status conversion rules.

According to an aspect of the invention, the method further comprises a step of emitting a message for communicating at least one updated generic status variable value GS toward a user terminal or an application executed on the management unit or on another connected management unit.

This communication may be carried out on request or not of the user or the application. According to an aspect of the invention, a notification and subscription system may be set up.

It should be noted that by other connected management unit, is meant another management unit present on the same local area network or on another local area network with a connection to the management unit executing the monitoring method.

According to an aspect of the invention, the step of determining the low-level device model instance comprises a determination of an index key on the basis of identification elements contained in the message or determinable upon reception of the message, whose combination enables a unique identification of a home automation device.

According to an aspect of the invention, the different identification elements, considered individually, are not necessarily unique for each device; but the combination of two or several information elements must be so. The identifier of the central control unit to which the home automation device is related or the address of the home automation device, or possibly that of its parent in a hierarchical addressing system in the local area network managed by the central control unit are examples of identification elements.

The present invention also concerns a method for controlling at least one home automation installation of a building, the home automation installation comprising a plurality of home automation devices, each home automation device being represented by at least one generic device model instance and at least one low-level device model instance; the method being executed by a management unit connected to the at least one home automation installation and comprising the following steps:

i. Reception of a command message coming from a user or an application on the central management unit or on another connected management unit, the command message corresponding to a generic command relating to a home automation device;

ii. Determination of the at least one generic device model instance representing the home automation device;

iii. Determination of the at least one low-level device model instance for the at least one generic device model instance determined at step iv. Determination of a command conversion converting the at least one generic command into at least one low-level command on the basis of at least one command conversion rule selected according to the at least one generic command or its name;

v. Sending at least one low-level command message comprising the at least one low-level command corresponding to the command conversion determined at step iv, toward a central control unit of the home automation installation so as to trigger the execution of at least one real command corresponding to the at least one low-level command on the home automation device corresponding to the low-level instance determined at step iii.

It should be noted that step iv may be carried out before or after step iii depending on the considered embodiments. In the case where step iv is carried out before step iii, a possible information relating to the local protocol may be used in addition to the information regarding the generic command. This information regarding the local protocol may be obtained from an identifier of the generic device model instance.

Thanks to the arrangements according to the invention, it is possible to proceed to a control, in particular to a remote control, of the home automation installation in a uniform manner regardless of the local communication or control protocol used to control the home automation devices. Thus, it is possible, for example, to provide a common programming interface for piloting all the real home automation devices having the same generic model, regardless of the local protocol and the underlying low-level device.

By other connected management unit, is meant another management unit present on the same local area network or on another network with a connection to the management unit executing the method.

According to an aspect of the invention, the command conversion rule is selected according to the at least one generic command or its name, and a low-level device type corresponding to the at least one low-level device model instance determined at step iii.

According to an aspect of the invention, the command conversion rules are stored in association with the following data:
- a low-level device type;
- a generic command name or identifier.

According to an aspect of the invention, the selection of the command conversion rule is carried out using the local communication protocol type and the name or identifier of the generic command.

According to an aspect of the invention, the command conversion of at least one generic command applicable to the at least one generic model instance into at least one low-level command corresponds to a combination of a plurality of low-level commands, and the sending step corresponds to sending a plurality of commands toward the central control unit so as to trigger the execution of a combination of a plurality of real commands on the device.

According to an aspect of the invention, the method further comprises the following steps:

in-memory storage of the correspondence between said generic command and the plurality of low-level commands; and determination of a result of the generic command according to the results of the corresponding low-level commands.

Thanks to these arrangements, it is possible to determine a global command result on the original generic command by aggregating commands results received for each executed low-level command.

According to an aspect of the invention, the generic command is considered to be performed if all the low-level commands have been successfully completed, and non-performed if one or several low-level command(s) have failed.

According to an aspect of the invention, the errors codes specific of the protocol are translated into generic error types.

The present invention also concerns a method for configuring at least one home automation installation of a building, the home automation installation comprising a plurality of home automation devices, each home automation device being represented by at least one generic device model instance and at least one low-level device model instance; the method is executed by a management unit connected to the at least one home automation installation and comprises the following steps:

i. reception of a configuration message emitted from a central control unit of a home automation installation or a user terminal, the message containing an indication on a commissioning, a configuration or a reconfiguration of a home automation device;

ii. determination of at least one low-level device model class or type corresponding to the home automation device;

iii. creation of at least one low-level device model instance according to the low-level device class or type defined at step ii and corresponding to the home automation device;

iv. determination of a model conversion converting a low-level device type or class into at least one generic device model class or type on the basis of a model conversion rule selected according to the low-level device model instance determined at step iii or its type;

v. creation of at least one generic device model instance for the at least one low-level device model instance on the basis of the at least one type or class corresponding to the model conversion determined at step iv.

According to an aspect of the invention, it is proceeded to a saving of the generic devices models instances in an associated manner with the low-level device model instance.

According to an aspect of the invention, the model conversion rules are stored in the form of an association between:

a low-level device type;

at least one corresponding generic device type or class GDT.

According to an aspect of the invention, the method further comprises the following steps:

Emission of a message for communicating the configuration of at least one device toward a user terminal or an application executed on the management unit or on another connected management unit.

This communication may be carried out on request or not of the user or the application. According to an aspect of the invention, a notification and subscription system may be set up.

By other connected management unit, is meant another management unit present on the same local area network or on another network with a connection to the management unit executing the method.

According to an aspect of the invention regarding the previously described configuration method, control method and monitoring method, the determination of at least one generic device model instance for the at least one low-level device model instance corresponds to a determination of a group of generic device models instances.

Thanks to these arrangements, it is possible to represent a complex real device offering multiple functions in a generic manner. In such a case, the generic device models instances relating to the same low-level device model instance are called subsystems.

This is in particular the case because the functional coverage of a low-level device model may be different depending on the considered protocols. Thus, a low-level device model may either cover a simple function, or multiple functions of a complex system. As an example, a heating equipment may functionally cover start/stop/setting commands of the heater which correspond to a first instance of a generic device model of the <<heating system>> type. This heating equipment may also comprise one or several temperature sensor(s), possibly localized at distinct positions which may correspond to instances of another generic device model relating to a <<sensor>> type or class.

Thus, it is possible to define a control scenario comprising a command intended to a first real device using a device corresponding to a second real device, such as for example a sensor belonging to the second real device.

This arrangement allows using these device portions or subsystems in a logically and functionally separate manner.

According to an aspect of the invention, each generic device model instance comprises a generic device unique identifier.

Thanks to these arrangements, the disclosed description is independent of the local communication protocol or of the details of implementation of the real device and of the underlying low-level device model instance.

According to an aspect of the invention, the generic device model defines a set of commands or functions associated to said model.

According to an aspect of the invention, the generic device model defines a set of statuses or status variables associated to said model.

According to an aspect of the invention, the generic device model defines a set of attributes associated to said model.

According to an aspect of the invention, the names of the statuses or status variables relating to a generic device model are explicit.

According to an aspect of the invention, the status variables values relating to a generic device model are standardized.

According to an aspect of the invention, the names of the commands relating to a generic device model are explicit.

According to an aspect of the invention, the commands parameters relating to a generic device model are standardized.

According to an aspect of the invention, the unique identifier of the generic model instance may be constituted in particular by an identifier using in particular an address notation independent of the protocol, for example according to a URL-type format.

According to an aspect of the invention, each low-level device model instance further comprises a unique low-level device identifier in the local area network associated to a central control unit of a home automation installation.

According to an aspect of the invention, the low-level device model defines a set of commands or functions associated to said model.

According to an aspect of the invention, the low-level device model defines a set of statuses or status variables associated to said model.

According to an aspect of the invention, the low-level device model defines a set of attributes associated to said model.

According to an aspect of the invention, each low-level device model instance comprises a device type or class.

According to an aspect of the invention, each low-level device model instance comprises a protocol type used in the local area network.

According to an aspect of the invention, a low-level device model instance RD may be associated to one or several low-level command(s) with:

a command name or identifier; and one or several low-level parameter(s).

According to an aspect of the invention, the description of the commands is not stored in the instances, but may be determined according to the low-level device type and/or the protocol type used in the local area network. In particular, a low-level command may be determined according to a command conversion rule.

According to an aspect of the invention, a reference meta-model is maintained to store common information on the low-level device models, their status variables and the relating commands, namely:

The supported low-level devices types and their names;

The supported low-level status variables with their identifiers RSID and the data types for the values;

The profiles describing the relationship between the low-level device models types and the authorized status variables values.

According to an aspect of the invention, this reference meta-model is shared within the architecture in order to enable integrity checks and an appropriate management of the status variables values of the low-level devices models instances when the knowledge of the data type is necessary, without the need to store this information for each low-level device model instance.

According to an aspect of the invention, the generic device unique identifier comprises a device logical address which establishes a correspondence between the at least one generic device model instance and a low-level device model instance.

According to an aspect of the invention, the device logical address comprises:

a communication protocol type of the device;

a communication path toward the device.

According to an aspect of the invention, the communication path toward the device includes the possible intermediate central control units and the termination addresses to cross, preferably organized according to a hierarchical topology.

According to an aspect of the invention, the logical address of the device further comprises:

a subsystem identifier if the generic device model instance belongs to a group of generic devices models instances associated to the same underlying low-level device model instance.

The present invention also concerns a computer program product comprising code instructions arranged to implement the steps of a method as detailed before, when said program is executed by a processor.

The present invention also concerns a system comprising a management unit arranged to execute one of the methods detailed hereinabove, connected to a central control unit of a home automation installation.

The above-described arrangements allow disposing at the level of the management unit of low-level information on the devices, and at the same time of high-level data. Thus, an abstraction effect is obtained without being deprived of the technical information of the underlying home automation protocols. This allows:

preserving a more succinct generic model submitted to the services and to the interfaces.

preserving the knowledge of the low-level particularities of each device.

For example, these arrangements may be implemented for:

The pairing phase of the products: indeed, the procedures may be specific depending on the protocol, the manufacturer and even the version of the product.

The realization of diagnosis services which requires access to the technical values and to the proprietary functionalities depending on the product model.

The possibility to reconfigure a product thanks to the information stored in this layer and in particular to enable the replacement of a defective product without going through all the pairing phases.

The compatible different aspects defined hereinabove may be combined.

BRIEF DESCRIPTION OF THE DRAWINGS

The invention will be better understood from the detailed description which is exposed hereinbelow with reference to the appended drawing in which.

DETAILED DESCRIPTION

In the following detailed description of the figures defined hereinabove, the same elements or the elements filling identical functions may preserve the same references so as to simplify the understanding of the invention.

Figure 1:
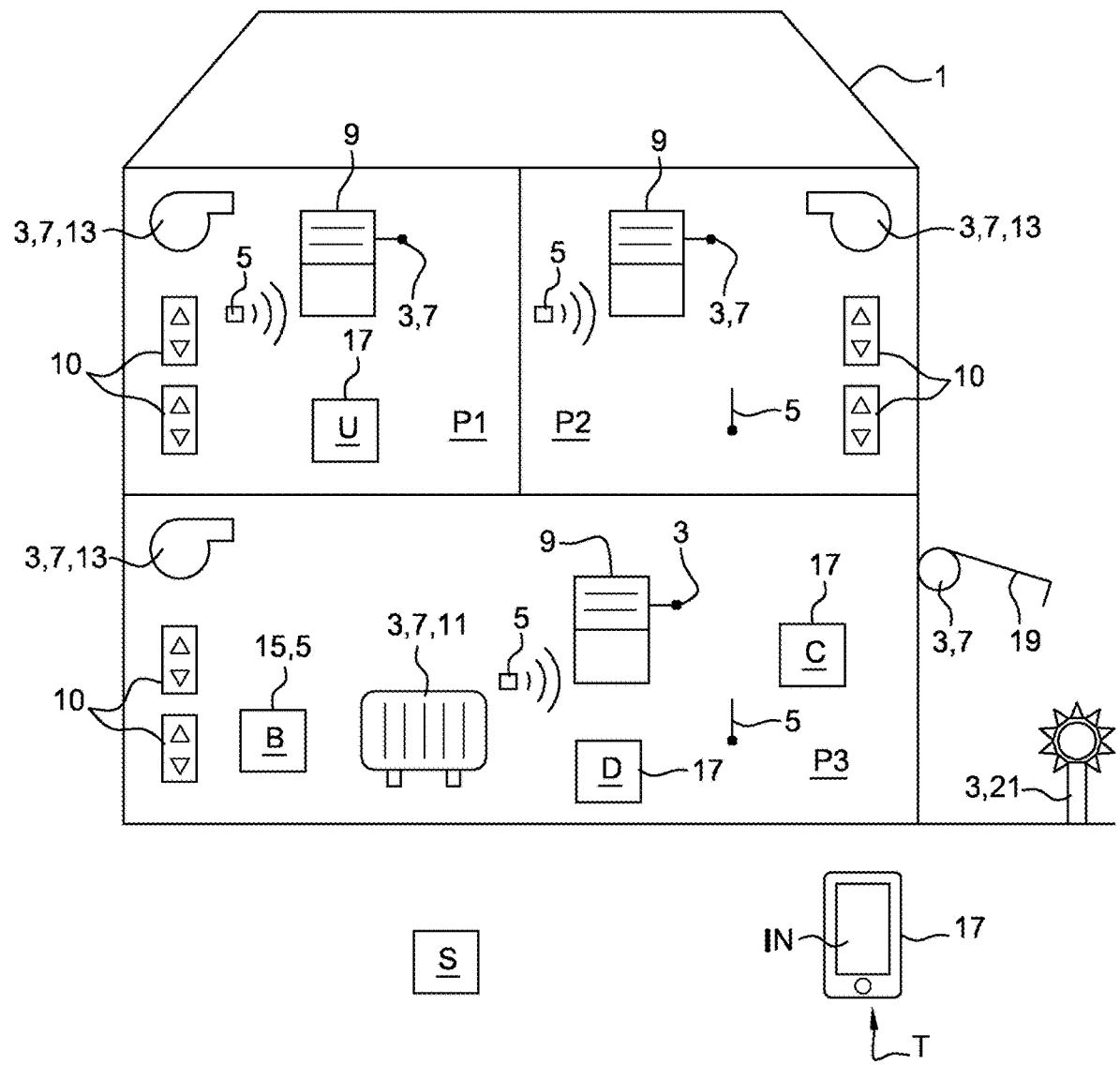
FIG. 1 is a schematic view of a building and of a home automation installation in accordance with an embodiment of the invention.

As illustrated in FIG. 1, a building 1 comprises for example three rooms P1, P2, P3. The building 1 also comprises home automation equipments 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, or still an alarm system.

The home automation installation 17 may also comprise a point 15 for controlling an actuator 7, such as a wireless control box B for the rolling shutter 9.

The home automation installation 17 may comprise one or several sensor(s) 5, integrated to an actuator 7, to a control point 15 or to the control box B or independently of these elements. In particular, a sensor 5 may be arranged to measure a physical quantity, for example a temperature sensor, an insolation sensor or a humidity sensor. Position sensors 5 of home automation equipments 3 of the building 1, such as, for example, sensors of the open status of a rolling shutter 9 or sensors of the position of a door leaf such as a window, whether motorized or not, may also be provided. The home automation installation may also comprise one or several occupancy sensor(s).

A home automation equipment 3 and a sensor 5 should thus be considered as units having information on observed actual statuses of elements of the building 1 and being capable of sharing this information with other elements of the home automation installation 17.

The home automation equipments 3 and the sensors 5 can thus have access to any measurable physical quantity, such as the temperature of each room P1, P2, P3 or a status of an element of the building 1, such as the open status of a rolling shutter 9, the status of an alarm, etc.

The home automation installation 17 comprises a central control unit U arranged to command and/or control all the home automation equipments 3 remotely, in particular using a wireless communication protocol, for example a radio communication protocol. The central control unit is arranged to group together all data coming from the home automation equipments 3 and to process this data.

The devices belong to a local area network within the home automation installation and communicate according to a local communication protocol. They have a local address in this network. The logical devices may be modelled as nodes or end points in the local area network.

The local addressing system may be hierarchical or flat, the address format may be numeric or alphanumeric.

Figure 2:
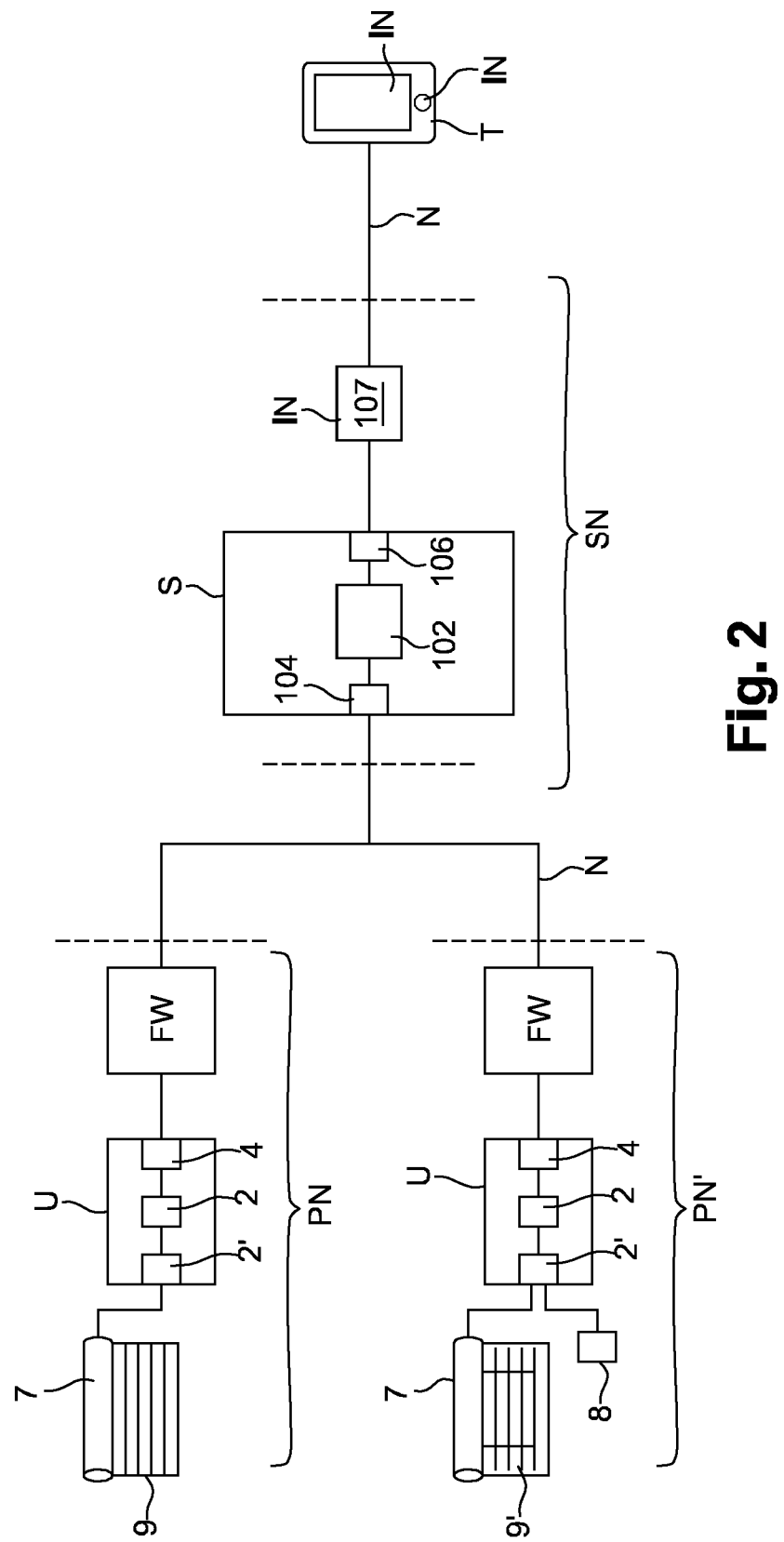
FIG. 2 is a diagram presenting an architecture of a system comprising the home automation installation illustrated in FIG. 1 as well as a server intended to be connected to a user terminal.

As represented in FIG. 2, the central control unit U is arranged to communicate with a server Sv.

The central control unit U is disposed on a private network PN, PN', whose access is generally protected by a firewall FW. The server Sv is also disposed on a private network SN. The private network PN is linked to a wide area network N, for example the Internet.

In particular, the central control unit U of the home automation installation 17 comprises a processing unit 2 arranged to contain and execute a first computer program. FIG. 2 represents two central control units U disposed on two private networks corresponding to different home automation installations. Of course, the server Sv is arranged to communicate with a set of such central control units U. We will describe in the following one of these units.

As an example, the processing unit 2 comprises a processor, a storage flash memory as well as a random access memory, and an Ethernet chip.

The central control unit U further comprises at least one communication module 2' intended to control and/or command home automation equipments 3 and/or sensors 5, the home automation equipments 3 may consist of actuators 7, lightings 21 or an alarm system.

As an example, as represented in FIG. 2, the communication module 2' enables the control and command of at least one actuator 7, a movable element of the building 1, such as for example a rolling shutter 9, or an orientable sunshade 9' or other actuators 7 or lightings 21, as previously described with reference to FIG. 1.

As an example, the communication module 2' may be arranged to implement for example one or several of the protocols Z-Wave, EnOcean, io-Homecontrol, Somfy RTS, KNX, MODBUS, Wavenis, Philips HUE.

There is also provided the reception of information from a sensor 5 supplying information on the presence of a user or values of the surrounding parameters such as temperature, humidity and luminosity. In the same manner, the central unit U may enable the control and/or command of an alarm system.

Each central control unit U further comprises a module 4 for communicating with the server Sv. The server Sv enables the remote command and/or control and comprises one or several processing unit(s) 102 arranged to contain and execute a second computer program.

The server Sv further comprises at least one communication interface 104 intended for the communication with the central unit U.

The server Sv may also comprise a communication interface 106 intended for the communication with a command and/or control interface IN enabling a user to remotely control the home automation installation.

It should be noted that the term server is a logical designation which may cover the use of several physical servers to distribute the computer processing load to carry out.

For example, the command and/or control interface IN comprises a web server 107 and a mobile communication terminal T communicating via the wide area network N. For example, the mobile communication terminal T may consist of a smartphone or a tablet.

The command and/or control interface IN comprises a processor which may be disposed at the level of the web server 107 and/or the mobile communication terminal T.

The processor of the command and/or control interface IN is arranged to use a third computer program. In turn, this third computer program is arranged to execute a downloadable application.

The mobile communication terminal T comprises a data input device and a display device, for example in the form of a tactile command portion of a screen of the terminal T and in the form of one or several button(s) of the terminal T.

Figure 3:
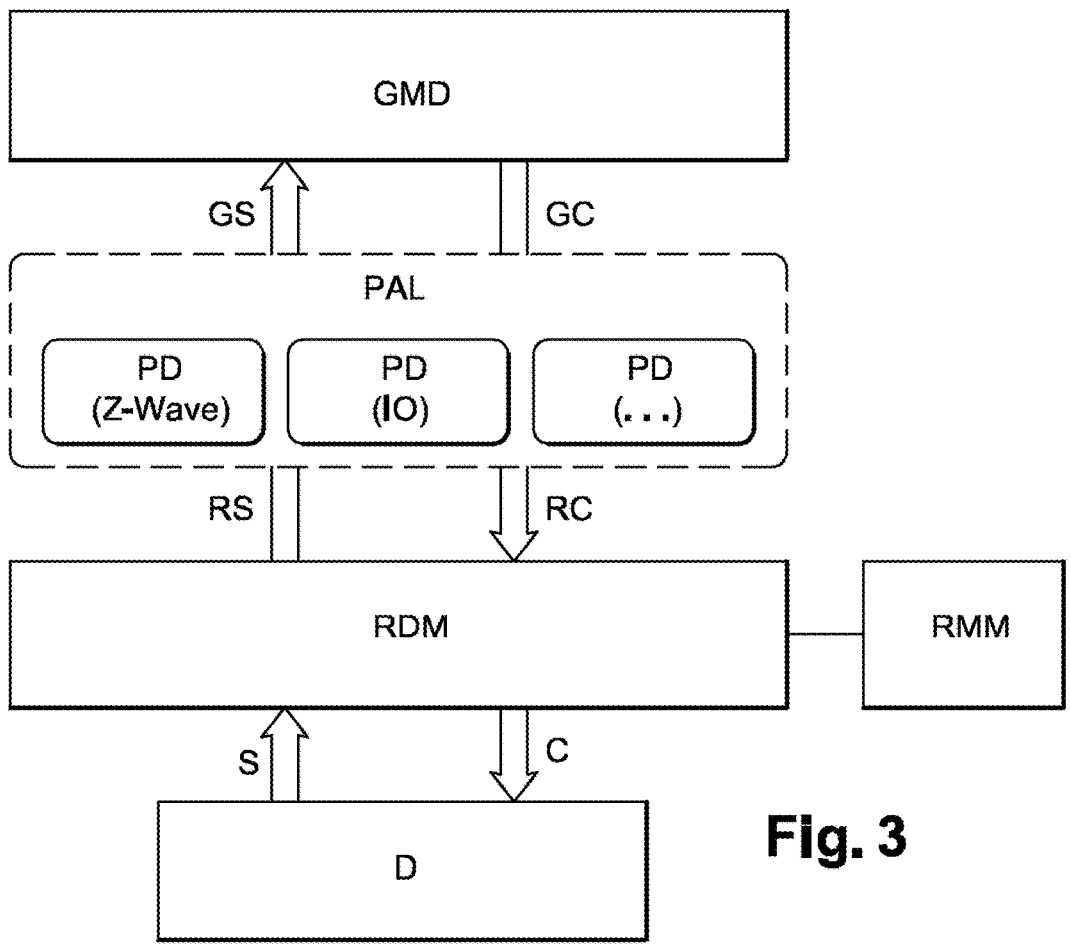
FIG. 3 is a diagram representing an abstraction system of the home automation devices.

According to an aspect of the invention, and as represented in FIG. 3, the processing unit of the server 102 is arranged to implement an abstraction system intended for the command and/or control of the devices, home automation equipments or sensors. In the following, we will use the device D designation indifferently to designate sensors or home automation equipments, or portions of home automation equipments 3 or sensors 5.

As represented in FIG. 3, the proposed abstraction systems implements:
- A plurality of low-level devices models RDM intended for the storage of information in a format specific of a protocol on a given real device D, one single model being represented in FIG. 3;
- A plurality of high-level generic devices models GDM enabling the description of the real devices D, their statuses S and the commands C independently of the protocol, one single model being represented in FIG. 3; and
- A plurality of protocols drivers PD which implement the necessary conversions to switch from one model to another and form a protocol abstraction layer PAL.

Figure 4:
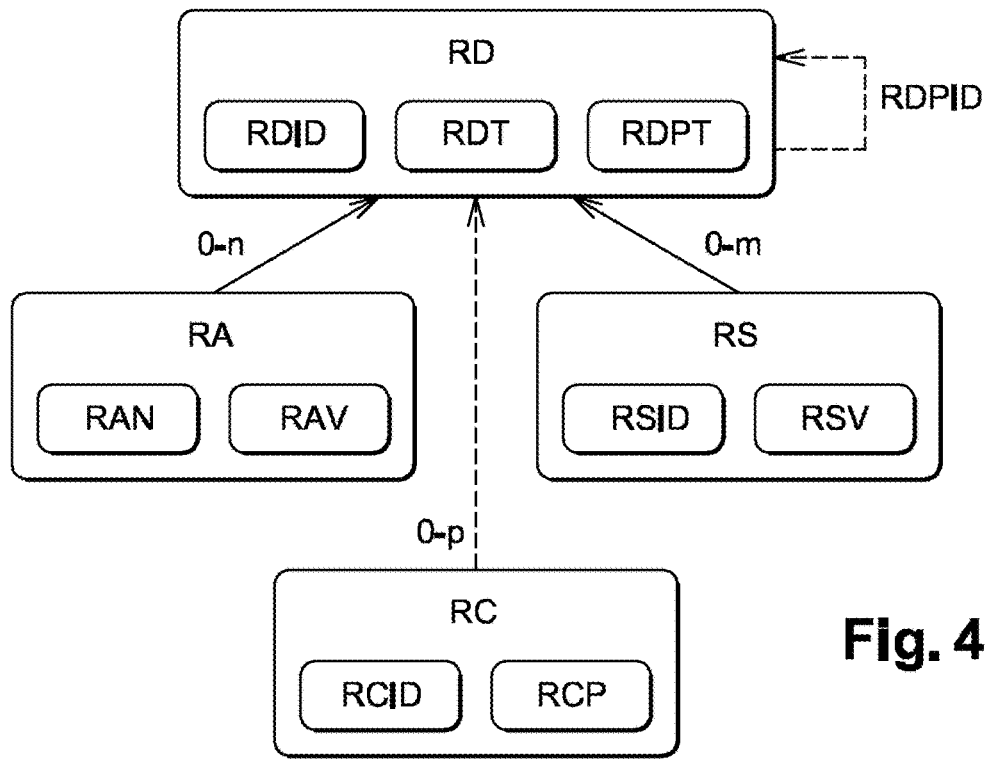
FIG. 4 is a diagram representing a low-level device model.

As represented in FIG. 4, the low-level device model enables the storage of information on the devices and their status, in a format close to their communication protocol native format.

The processing of the information stored in this model for a given device implies a knowledge of the particular protocol and of the data format for this device. According to an aspect of the invention, this model may have a structure format common for the different types of low-level devices, but the types of the attributes, status variables and commands defined in this model are not generic.

Each instance RD of a low-level model RDM corresponds to an addressable node in the local area network to which it belongs and in which it communicates according to the target protocol. The node acts as a termination. Such a node may correspond to a physical device, a portion of a device (a functional subset).

An instance RD of a low-level model comprises:
- An identifier of the low-level model instance RDID, which may comprise in particular a termination address in the local area network;
- A device type or class RDT;
- A protocol type RDPT used in the local area network.

The identifier RDID or address is used as a communication address or as a routing path. This address is unique, at least in the local area network to which belongs the device D.

The type information RDT may be obtained directly from the home automation device D, but it may be necessary to use external reference tables or even information supplied by a user in order to determine the exact device type. In the case where this information is requested from the user, this information RDT may be requested once from the user during the configuration/pairing phase of the product and stored afterwards in the instance RD, in particular in the database IDB which will be described later on.

Moreover, each low-level model instance RD may have:
- One or several attribute(s) RA;
- One or several status variable(s) RS;

In particular, an attribute RA is defined by an attribute name RAN and by a value RAV. For example, the attributes RA represent additional type and/or configuration information obtained for example during the pairing phase. In particular, the attributes are information which are invariable after the pairing.

In particular, a status variable RS is defined by a unique identifier RSID in the context of the considered low-level device model RDM, and by a value RSV. The low-level devices models instances RD having status variables RS may authorize requests on their status and/or send notifications when the value of the status variable RSV changes.

A low-level device model instance RD may also include a parent address RDPID. The parent address RDPID enables the low-level device models instances RD of the same protocol to be organized into a hierarchical nodes tree. This is useful for the protocols in which the hierarchical topology is necessary for the routing of the information toward the nodes, or in the case where a device cannot exist without a parent.

Thus, all the instances RD of an installation 17 may form a list or a nodes tree, in the case of a hierarchical topology, depending on the used protocols.

As indicated in FIG. 3, a reference meta-model RMM is maintained to store common information on the low-level device models RDM, their status variables RS and the relating commands RC, namely:
- The supported low-level devices types RT and their names;
- The supported low-level status variables RS with their identifiers RSID and the data types for the values RSV;
- The profiles describing the relationship between the low-level device models types RDM and the authorized status variables RS values.

This reference meta-model RMM is shared within the architecture in order to enable integrity checks and an appropriate management of the status variables values RSV of the low-level devices models instances RD when the knowledge of the data type is necessary, without the need to store this information for each low-level device model instance RD.

Figure 5:
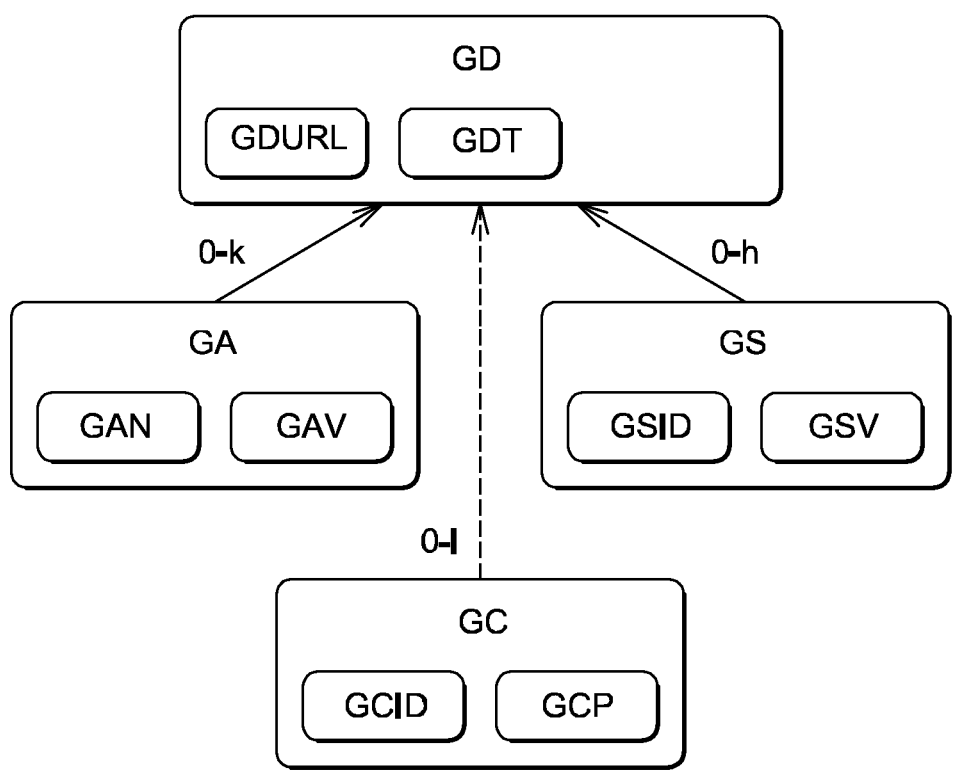
FIG. 5 is a diagram representing a generic device model.

As represented in FIG. 5, the generic device model GDM is a model independent of the protocol allowing describing the devices of the building in a functional manner.

In particular, a generic device model instance GD comprises:
- A unique identifier of the generic model instance GDURL, which may be constituted in particular by an identifier using in particular an address notation independent of the protocol, for example according to a URL-type format;
- A generic device type or class GDT;

Moreover, each generic model instance GD may have:
- One or several attribute(s) GA;
- One or several status variable(s) GS.

In particular, an attribute GA is defined by an attribute name GAN and by a value GAV. For example, the attributes GA represent additional type and/or configuration information obtained for example during the pairing phase.

In particular, a status variable GS is defined by a unique identifier or name GSID in the context of the considered generic device model GDM, and by a value GSV. The generic device models instances GD having status variables GS may authorize requests on their status and/or send notifications when the value of the status variable GSV changes.

A generic device model instance GD may have at least one status variable GS. This status variable GS has an explicit status identifier or name GSID predefined by the considered model, and a status variable value GSV, selected among several predefined values or belonging to a range of status variables values predefined by the considered model.

Furthermore, a generic device model instance GD may be associated to one or several generic command(s) GC with:
- An explicit command name GCID, and
- One or several standardized parameters GCP.

The supported commands are defined by the generic device model GDM.

This description is independent of the real protocol or of the details of implementation of an underlying low-level device model RDM.

As an example, a rolling shutter may be modeled by a generic device model instance GD defined in the following manner:

Class or Type GDT: «Positionable Roller Shutter»/(PositionableRollerShutter),

Status variable GS: «Closure state»/(ClosureState) which may take on values according to a standardized scale from 0 to 100%;

Supported generic command GC: «Opening setting»/(SetClosure) with an opening parameter (amount) which may take on values according to a standardized scale from 0 to 100%.

A generic device model instance GD is implicitly linked to at least one underlying low-level device model instance RD. In practice, this link may be modeled by the unique identifier of the generic model instance GDURL which corresponds to a device address, and which acts both as a unique identifier and as a pointer to the underlying low-level device model instance RD. The realization of the link or of the index key will be detailed later on.

It should be noted that in certain cases, a low-level device model instance RD may correspond to several high-level models instances GD.

This is in particular the case because the functional coverage of a low-level device model may be different depending on the considered protocols. Thus, a low-level device model may either cover a simple function, or multiple functions of a complex system. As an example, a heating system may functionally cover start/stop/setting commands of the heater which correspond to a first instance of a generic device model GD of the «heating system» type. This system may also comprise one or several temperature sensor(s), possibly localized at distinct positions of the home automation installation which may correspond to instances of another generic device model GD relating to a «sensor» type or class.

The designed abstraction system allows modeling several generic device models instances GD on the basis of the same real device and of the same underlying low-level device model instance RD.

In such a case, the generic devices models instances GD relating to the same low-level device instance RD may be called subsystems.

In the case where several home automation devices D are grouped, in their native protocol, for example in the case of a set of shutters of a facade of a building, it is possible to create a virtual low-level device model instance RD, to represent the group in a format close to its native protocol, and then link this virtual low-level device model instance RD to one or several generic device model instance(s) GD. In this manner, it is possible to preserve a correspondence between at least one generic device model instance GD and a low-level device model instance RD.

The structure of the unique identifier of a generic model instance GDURL will now be described in connection with a particular embodiment.

According to this embodiment, the unique identifier of a generic model instance GDURL comprises information on:

The local native protocol of the home automation device D,

The communication path toward the device D, including the intermediate central control units U and the termination addresses to cross, whether organized or not in a hierarchical topology;

A subsystem identifier subsystemId if the device belongs to a group of generic devices models instances GD associated to the same underlying low-level device model instance RD. The devices which are a unique expression of a low-level device model instance GD have no extension for identifying a subsystem.

Thus, the form of the unique identifier of a generic model instance GDURL may be as follows:

<protocol>://<gatewayId>/<rawDeviceAddress>(#<subsystemId>)

Wherein the following fields are present:

protocol: identifier of the native device local protocol.

gatewayId: identifier of the first central control unit U, for example a serial number or a unique identifier.

rawDeviceAddress: a simple or multi-level path. Its meaning and its format depend on the addressing scheme of the local communication protocol of the device D.

subsystemId: this optional field indicates an identification, for example a rank of the subsystem (starting for example at 1), if such a subsystem is present.

EXAMPLES 1) knx://0201-0001-1234/1.1.3

This unique identifier of a generic device model instance GDURL corresponds to a device D communicating by the KNX protocol with an individual address 1.1.3 accessible to the central control unit U carrying the identifier #0201-0001-1234.

2) io://0201-0001-1234/145036#2

This unique identifier of a generic model instance GDURL corresponds to a subsystem carrying the number 2 associated to a device D communicating by the io-Homecontrol protocol with a radio address 145036 accessible to the central control unit U carrying the identifier #0201-0001-1234.

The manipulations of the different low-level device RD and generic device GD models instances are carried out by an execution process or service ES. In order to store the different above-mentioned models instances, the execution service may have access to an instances database IDB. Of course, these different instances types may also be stored in a separate manner. Moreover, by database, is herein meant an appropriate storage method for a set of instances, which may be memorized in a list, a tree or tables or any other appropriate data structure.

An embodiment of the database IDB will now be described. According to this embodiment, the database IDB may contain tables organized in the form of tables. Each row corresponds to a low-level RD or generic GD home automation device model instance, depending on the considered table. The columns correspond to the different types of stored information.

Thus, a table RDTbI of the low-level device model instances RD may contain columns comprising the following data:

I-the identifier of the central control unit U to which a home automation device UID is related;

II-the address of the home automation device in the local area network managed by the central control unit RDID;

III-the used local protocol type RDPT;

IV-low-level device model type RDT, corresponding for example to a designation of a rolling shutter or a lighting.

An index key RDK, unique for each home automation device, is used. This unique index key RDK may be generated from the three elements I, II, III listed hereinabove; it may be stored in each table. Another possibility consists in using as an index key RDK an identifier which automatically increments as data are inputted in the database IDB.

Yet according to another possibility, the index key RDK may be calculated at each access, starting from the elements I, II, and possibly III.

In general, in the case where the index key is calculated, this calculation may be based on identification elements. The combined identification elements must enable the identification of a unique low-level home automation device RD.

It should be noted that the different identification elements, considered individually, are not necessarily unique for each device but the combination of two or several information elements must be so. The identifier UID of the central control unit U to which the home automation device D is related or the address RDID of the home automation device, or possibly that of its parent in a hierarchical addressing system in the local area network managed by the central control unit U are examples of identification elements mentioned hereinabove.

These two elements are sufficient for an unambiguous identification of the home automation device. Other identification elements may be used, for example the local protocol type used by the device. This additional identification element enables the rapid selection of the concerned instances RD, GD, and of the protocol driver PD to execute, since a protocol driver PD is specific of a native protocol type.

It should be noted that, in the case where the index key is calculated at each access, the same information may be present in identification elements under different formats.

An example of a row of the table RDTbI is reproduced hereinbelow.

| UID | RDID | RDPT | RDT |
|---|---|---|---|
| 0201-0001-1234 | 120403 | 10 | 0x0100202 |

This row corresponds to a table in which the index key RDK is calculated and not stored, for a device linked to a central control unit carrying the identifier 0201-0001-1234, the device being identified by its io-Homecontrol radio address 120403 on the local area network 10, the used local protocol type being io-Homecontrol, the low-level device model type being 0x0100202, which corresponds according to an implementation to a rolling shutter with a low-speed management of the manufacturer SOMFY.

Other information, such as the name of the status variables RSID, the values of the status variables RSV, binary indicators (TRUE/FALSE) for commands in progress, etc., may be stored in different tables or in the same table. If different tables are used, the unique index key RDK for each low-level device model instance RD ensures the correspondence between the stored information and the concerned device.

A table GDTbI of the generic device model instances GD may comprise columns including the following data:

I-the unique identifier of a generic model instance GDURL;

II-the generic device class or type GDT.

Thus, an example of a row of the table GDTbI, corresponding to the previously illustrated example of a row of the table RDTbI is reproduced hereinbelow.

| GDURL | GDT |
|---|---|
| io://0201-0001-1234/120403 | RollerShutterWithLowSpeedSupport |

This row relates to a generic device model instance GD corresponding to the low-level device model instance RD represented in the previously represented example of table RDTbI.

Other information, such as the name of the status variables GSID, the values of the status variables GSV may be stored in different tables or in the same table. It may be interesting to associate other information to the generic devices models instances, such as a name, a physical location of the device D in the installation. Nonetheless, this information cannot necessarily be detected and are typically defined by the installer or the user.

A unique index key GDK, representing a given home automation device, may be stored in the table.

Like the table of the low-level instances, the index key may be calculated at each access. For access to the table of the generic model instances, it may be useful to calculate this key GDK from the identifier GDURL, for example by directly using this identifier as a key.

The low-level RD and generic GD models instances are calculated and/or stored with the same value of the index key GDK or RDK, possibly by adding a subsystem identifier in the case where several generic device instances GD correspond to one single low-level device model instance.

According to one implementation, the generic device model instances GD are only partially memorized in a persistent manner. Thus, only the device identifiers GDURL and the classes or types GDT are persistent. The attributes GA and the status variables GS are recalculated from the data of the low-level models instances as will be described later on.

The protocols drivers PD identified in FIG. 3 will now be described. The protocol drivers implement the central logic of the abstraction layer, namely the various conversion rules between both the generic and low-level models. There may be a protocol driver PD for each supported protocol type, even though different drivers may share common functionalities, by capitalizing on the existing implementations.

Each protocol driver PD may carry out a set of conversions operations. In order to carry out the different conversions mentioned hereinbelow, a protocol driver may be associated to a conversion rules database RDB comprising the different types of conversion rules mentioned hereinbelow, namely: models conversion rules MCR; status conversion rules SCR; command conversion rules CCR. Of course, these different types of rules may also be stored in a separate manner. Moreover, by database, is herein meant an appropriate storage method for a set of rules, which may be memorized in a list, a tree or tables or any other appropriate data structure. It should be noted that the conversions rules MCR, SCR, CCR are stored or saved independently of the instances. These arrangements allow limiting the volume of information relating to the conversions which are not duplicated for each model instance.

In particular, a protocol driver PD can carry out a model conversion CvM, that is to say the determination or the selection of a generic device class or type GDT, or a list of classes or types GDT, from a given low-level device model instance RD, on the basis of at least one model conversion rule MCR. If the low-level device model instance RD requires being represented by several generic devices models instances GD, the driver will return a list of such subsystems as a model conversion CvM. In particular, the selection of a generic device class may use the type of a low-level device model instance RDT but may also use other attributes in the selection process. This is useful for example for the modular devices for which an optional function may be present or not. For example: the optional presence of an additional sensor for a heating system.

According to one embodiment, the protocol driver PD can carry out the determination of the generic device model type or class GDT by referring to a table MTbI of its database RDB. As an example, the table MTbI may comprise columns comprising the following data:
- a low-level device type RDT
- at least one corresponding generic device type or class GDT.

Two examples of type GDT selection are described hereinbelow.

Example 1

We suppose that the discovered or configured low-level device instance RD is defined in the manner described in the table hereinbelow:

| RDPT | RDT | RA | RDID |
|------|-----|----|----|
| IO | 0x0100202 | — | 120403 |

This row corresponds to a device identified by its io-Homecontrol radio address 120403 on a local area network 10 managed by a central control unit defined by a non-represented identifier UID, the used local protocol type being io-Homecontrol, the low-level device model type being 0x0100202, which corresponds according to an implementation to a rolling shutter with a low-speed management of the manufacturer SOMFY.

These data are communicated as an input to the protocol driver PD corresponding to the io-Homecontrol protocol. The protocol driver carries out the determination of the generic device model type or class GDT by referring to the table MTbI of its database RDB. The selection allows identifying an example of a row of the table MTbI reproduced hereinbelow.

| RDT | GDT |
|-----|-----|
| 0x0100202 | RollerShutterWithLowSpeedSupport |

Thus, the identified generic device type is «rolling shutter with a low-speed management»/(RollerShutterWithLowSpeedSupport). In this example, the low-level device type RDT is associated to one single generic device type which corresponds to the model conversion CvM. There is no subsystem.

Example 2

We suppose that the discovered or configured low-level device instance RD is defined in the manner described in the table hereinbelow.

| RDPT | RDT | RA | RDID |
|------|-----|----|------|
| MODBUS | 0x00101 | 'sensorAvailable'=true | 4 |

This row corresponds to a device identified by its bus address MODBUS 4 on the local area network MODBUS, the used local protocol type being MODBUS, the low-level device model type being 0x00101, which corresponds according to an implementation to a heating system with an optional outside temperature sensor.

These data are communicated as an input to the protocol driver PD corresponding to the protocol MODBUS. The protocol driver carries out the determination of the generic device model type or class GDT by referring to the table MTbI of its database RDB. The selection allows identifying an example of a row of the table MTbI reproduced hereinbelow.

| RDT | GDT |
|-----|-----|
| 0x00101 | HeatingSystemController<br>OutsideAirTemperatureSensor (only if attribute 'sensorAvailable'=true) |

Thus, the identified generic device types GDT are:
- «Heating system controller»/(HeatingSystemController); and
- «Outside temperature sensor»/(OutsideAirTemperatureSensor).

In this example, the low-level device type RDT is associated to two generic device types which correspond to the model conversion CvM. Thus, the low-level device model instance RD will be associated to two generic device model instances GD which form two subsystems, namely a main controller and a sensor. In this example, the sensor is optional but is present on the considered particular device. If the sensor was not present, for example because it has not been installed, the protocol driver would have returned only one type hence corresponding to one single subsystem, namely the main controller.

Moreover, a protocol driver PD can proceed to the conversion of a low-level status variable RS into one or several generic status variable(s) GS described in the generic device class GDT, on the basis of at least one status conversion rule SCR. Thus, a protocol driver can determine the values of the generic status variables GS of a generic device model type GDT from the values of low-level status variables RS corresponding to a given identifier RSID.

According to one embodiment, the protocol driver PD can carry out the determination of a status conversion CvS of a low-level status variable RS into one or several generic status variable(s) GS by referring to a table STbl of its database RDB. As an example, the table STbl may comprise columns comprising the following data:
- a generic variable identifier or name GSID;
- a generic device type GDT;
- a low-level variable identifier or name RSID;
- a status conversion rule SCR between the value of a low-level status variable RSV and a value of a generic status variable GSV.

Two examples of low-level status variable conversion RS are described hereinbelow.

Example 1

We suppose that a message is received from a central control unit U of a home automation installation 17 containing an indication on a modification regarding the value of a status variable S of the device defined in the manner described in the table hereinbelow.

| RDPT | RDID | RSID | RSV |
|------|------|------|-----|
| MODBUS | 1234 | 0x0C213 | 123 |

This message corresponds to the update of the status variable RSID 0x00213 corresponding to the regulation mode of a device of the heating system type at the address RDID 1234 of its local area network communicating according to the local protocol RDPT MODBUS, the new value RSV being 123.

On this basis, the protocol driver PD of the protocol MODBUS can proceed to the conversion, by selecting a status conversion rule SCR or a conversion function using the low-level device type RDT (not represented) and the name or identifier of the low-level status variable RSID.

The selection allows identifying an example of a row of the table STbl reproduced hereinbelow.

| GSID | GDT | RSID | SCR |
|---|---|---|---|
| RegulationModeState | HeatingSystem | 0x0C213 | if (v == 123) then return 'auto' else return 'manual' end; |

Thus, the identified new value 123 for the low-level status variable identified by the RSID 0x00213 corresponds to the status conversion value CvS «Auto» for a generic variable GS «RegulationModeState» of a generic device model instance «HeatingSystem».

Example 2

We suppose that a message is received from a central control unit U of a home automation installation 17 containing an indication on a modification regarding a status variable RS of the low-level device. The update of a status variable RS is described in the table hereinbelow.

| RDPT | RDID | RSID | RSV |
|---|---|---|---|
| 10 | 101 | 0x14 | 1024000 |

This message corresponds to the update of the status variable RSID 0x014 corresponding to the temperature measured by a sensor of a heating system at the address RDID 101 of its local area network communicating according to the local protocol RDPT io-Homecontrol, the new value RSV being 1024000.

On this basis, the protocol pilot PD of the io-Homecontrol protocol can proceed to the conversion, by selecting a status conversion rule SCR or a conversion function using the low-level device type RDT (not represented) and the name or identifier of the low-level status variable RSID.

The selection allows identifying an example of a row of the table STbl reproduced hereinbelow.

| GSID | GDT | RSID | SCR |
|---|---|---|---|
| TemperatureState | TemperatureSensor | 0x14 | return v/51200; |

Thus, the identified new value 1024000 for the status variable identified by the RSID 0x014 corresponds to a status conversion value CvS of 21 (° C.) for a generic variable GS of Temperature/(«TemperatureState») of a generic device model instance of the type «Temperature Sensor»/(TemperatureSensor).

Furthermore, a protocol driver can proceed to the conversion of the generic commands GC associated to a generic device model instance GD into one or several low-level command(s) RC specific of the protocol to execute on the real device D, on the basis of at least one command conversion rule CCR. For example, the above-described command setClosure(50%) may have different translations depending on the protocol of the low-level device RD and on its type RDT, and sometimes on the particular configuration of this device. This conversion is implemented in the protocol driver corresponding to the local communication protocol used by the home automation device.

Thus, in order to convert a generic command GC into a low-level command RC or a combination of low-level commands RC, it should be proceeded to:
    a recognition of the target low-level device model instance RD, via the supplied generic device model instance identifier GDURL; then
    a determination of the conversion to carry out on the basis of the selected instance RD using a command conversion rule CCR or a conversion function.

In most cases, the protocol driver uses only the low-level device type RDT, but in certain complex cases, the value of certain attributes may be necessary to completely determine the low-level command to generate. In such cases, the protocol driver can access to the requested attributes using the central control unit identifier UID and the identifier of the low-level device instance RDID.

The generic command GC may have parameters, in which case these will be transmitted to the conversion rule CCR. The conversion rule CCR may also use contextual information such as the intended use of the command or the priority level of the command. Afterwards, the low-level commands may be transmitted to the corresponding central command unit for execution.

According to one embodiment, the protocol driver PD can carry out the determination of a conversion of a generic command GC into one or several low-level command(s) RC by referring to a table CTbl of its database RDB. As an example, the table CTbl may comprise columns comprising the following data:
    a low-level device type RDT;
    a generic command name or identifier GCID,
    a command conversion rule CCR or a conversion function.

Two examples of a generic command conversion GC are described hereinbelow.

Example 1

We suppose that the invoked generic command GC is defined in the manner described in the table hereinbelow.

| GDURL | GC |
|---|---|
| io://1234-5678-0000/120403 | setClosure(60%) |

This command corresponds to an order to a rolling shutter communicating in the io-Homecontrol protocol with a radio address 120403 in the local area network managed by the central control unit having the identifier 1234-5678-0000, to close to 60%.

A first step should be to determine the corresponding low-level device model instance and its type, using the address comprised in the GDURL. We will suppose that the low-level device type RDT is 0x0100202, which corresponds to a rolling shutter with a low-speed management of the manufacturer SOMFY.

Afterwards, on this basis, the protocol driver can proceed to the conversion, by selecting a command conversion rule CCR or a conversion function using the low-level device type RDT and the name or identifier of the generic command GCID.

The selection allows identifying an example of a row of the table CTbI reproduced hereinbelow.

| RDT | GCID | CCR |
| --- | --- | --- |
| 0x0100202 | setClosure (with one parameter p1) | return createActivateFunc(p1*51200) |

The command conversion rule CCR creates a low-level command RC of the type 'Activate Func', specific of the io-Homecontrol protocol with a main parameter scaled from the generic parameter p1. Herein, the function «createActivateFuncQ»returns binary data intended to be used by a central control unit U to form the body (payload) of a io-Homecontrol radio frame.

Example 2

We suppose that the invoked generic command GC is defined in the manner described in the table hereinbelow.

| GDURL | GC |
| --- | --- |
| modbus://1234-5678-0000/4 | setTargetTemperature(21) |

This command corresponds to an order to a heating system communicating in MODUBS with a bus address 4 in the local area network managed by the central control unit 1234-5678-0000 to set its thermostat on a setpoint temperature of 21° C.

A first step should be to determine the corresponding low-level device model instance and its type, using the address comprised in the GDURL. We will suppose that the low-level device type RDT is 0x00101, which corresponds according to an implementation to a heating system with an optional outside temperature sensor.

Afterwards, on this basis, the protocol driver can proceed to the conversion, by selecting a command conversion rule CCR or a conversion function using the low-level device type RDT and the name or identifier of the generic command GCID.

The selection allows identifying an example of a row of the table CTbI reproduced hereinbelow.

| RDT | GCID | CCR |
| --- | --- | --- |
| 0x00101 | setTargetTemperature (with one parameter p1) | return { createConfigurationModeCommande( ), createSetTargetTemperatureCommand(p1) } |

The command conversion rule CCR creates two low-level commands RC: the first command sets the device in the configuration mode and the second command defines the target temperature using the value of the generic parameter p1. Herein, the functions «createConfigurationModeCommandQ» and «createSetTargetTemperatureCommand( )» return binary data specific of the protocol MODBUS intended to be transmitted on the bus of the device by a central control unit U to change the configuration of the heating system.

Figure 6:
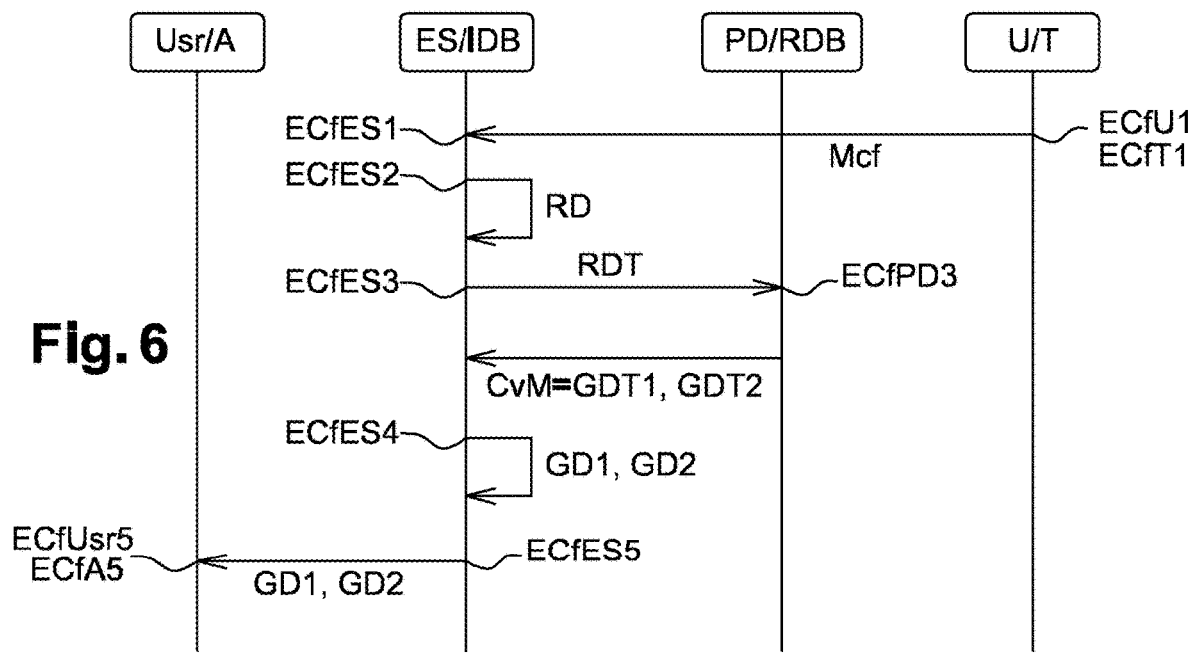
FIG. 6 is a diagram illustrating an implementation of a method for configuring a home automation installation according to the invention.
Figure 7:
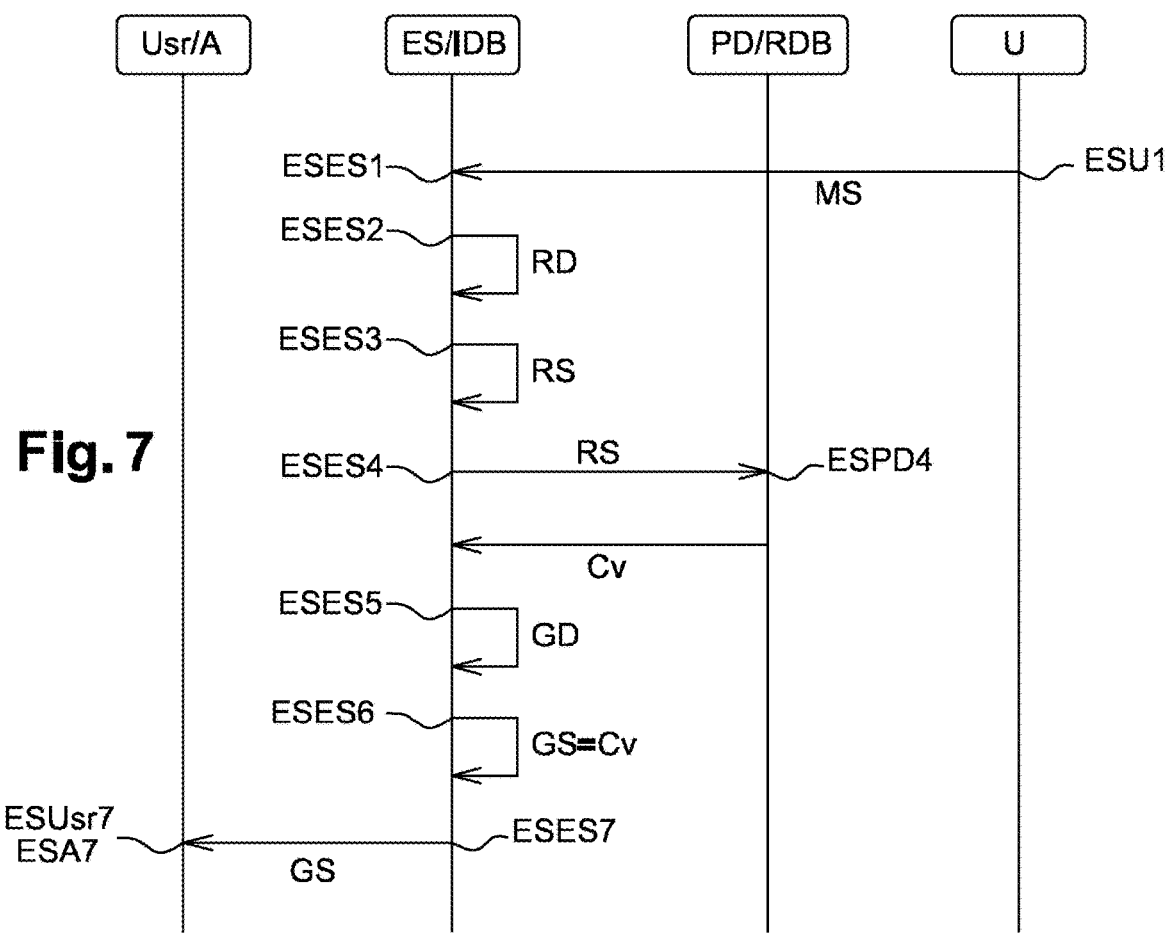
FIG. 7 is a diagram illustrating an implementation of a method for monitoring a home automation installation according to the invention.
Figure 8:
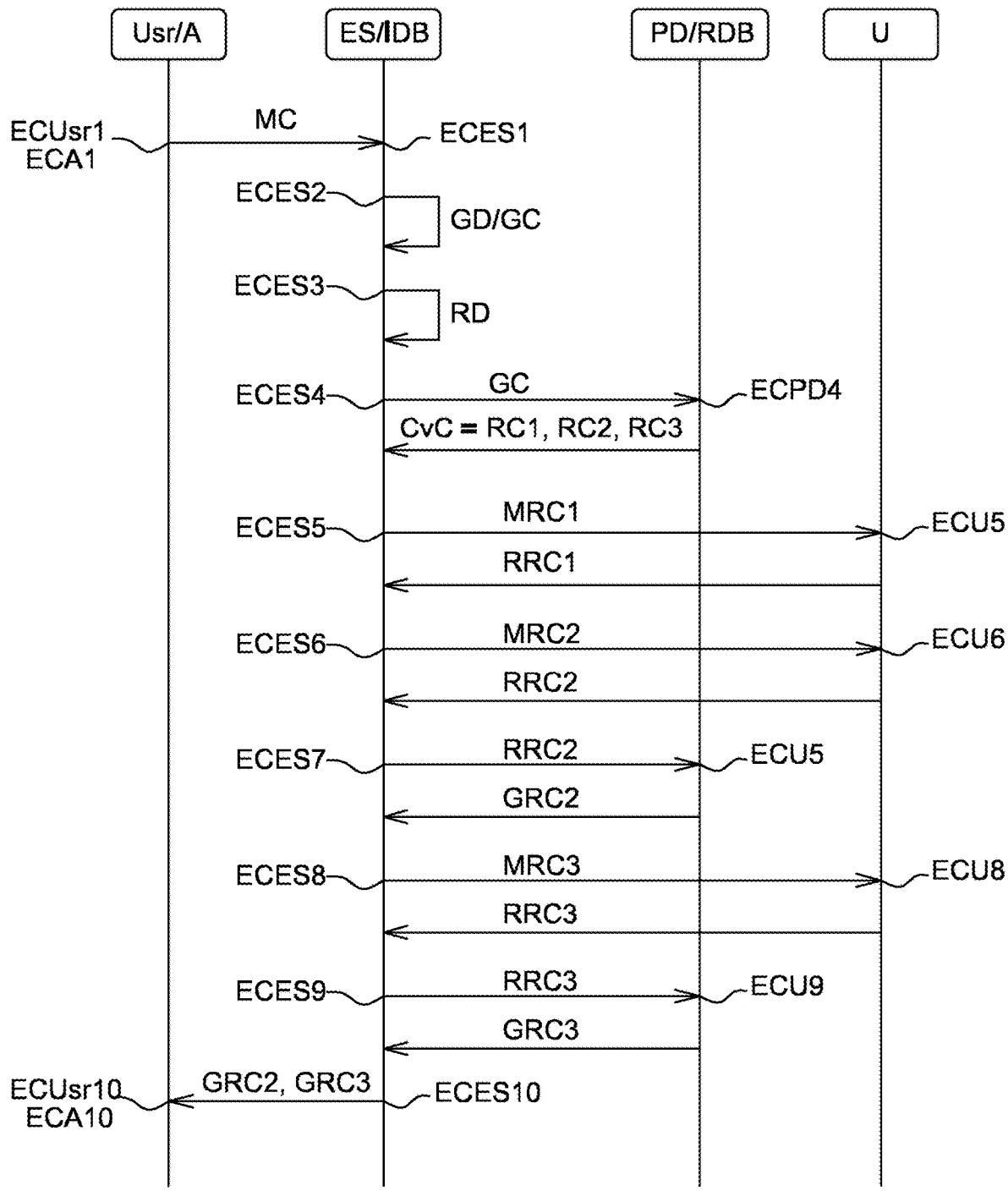
FIG. 8 is a diagram illustrating an implementation of a method for controlling a home automation installation according to the invention.

FIGS. 6 to 8 represent methods for implementing configuration, monitoring and control methods on the basis of the above-described system.

A method for configuring at least one home automation installation 17 of a building 1 executed by a server Sv connected to the at least one home automation installation 17 will now be described with reference to FIG. 6.

At first, the method comprises a step ECfESI of receiving a configuration message MCf emitted from a central control unit U of a home automation installation 17, at a step ECfU1. The configuration message MCf contains an indication on a commissioning of a new home automation device D or of an update/reconfiguration of a device installed beforehand.

According to one variant, it is possible that the message MCf is emitted by a terminal T of a user at a step ECfTI. As an example, in the case of unidirectional protocols, the user can perform the commissioning, the configuration or the reconfiguration/update of the device D on the location of the home automation installation and afterwards send the information with his terminal T to initiate the configuration method. Afterwards, the method comprises a step ECfES2 of creating the at least one low-level device model instance RD representing the home automation device D. The low-level device model instance RD is stored in the database IDB accessible to the execution service ES. In particular, a row of the table RDTbI may be created as has been described before on the basis of the information contained or deduced from the reception of the message MCf. Indeed, the content of the message MCf or the information on its emitter allow determining information on:

- the identifier of the central control unit U to which a home automation device is related UID;
- the address of the home automation device in the local area network managed by the central control unit RDID;
- the used local protocol type RDPT;
- low-level device model type RDT, corresponding for example to a designation of a rolling shutter or a lighting.

A step ECfS3 of determining a generic device class or type GDT, or a list of classes or types GDT, from a given low-level device model instance RD is carried out afterwards, which corresponds to the determination of a model conversion CvM. This step is carried out by means of an invocation of a function of the protocol driver PD which receives this invocation at a step ECfPD3 and which disposes of the conversion rules database RDB comprising model conversion rules MCR. If the low-level device model instance RD requires being represented by several generic devices models instances GD, the driver will return a list of such subsystems classes or types GDT1, GDT2, as has also been described before.

A step ECfES4 of creating the at least one generic device model instance GD1, GD2 for the at least one low-level device model instance RD is carried out afterwards on the basis of the types or classes GDT1, GDT2 determined at step ECfES3. The generic devices models instances GD1, GD2 are stored in the database IDB, for example in a table GDTbI as has been described before. In particular, the link between a low-level device model instance RD and one or several generic models instances GD1, GD2 may be carried out by the identifiers GDURL or the index keys GDK and RDK as has been described before.

The method may comprise a subsequent step ECfES5 of notifying the user on the configuration of a new device D, on request or not of the user, who receives this notification at a step ECfUsr5. It is also possible to proceed to the notification of another application A executed on the server Sv which receives this notification at a step ECfA5.

The configuration method is carried out during the commissioning, the configuration or the reconfiguration of a home automation equipment D.

A method for monitoring at least one home automation installation 17 of a building 1 executed by a server Sv connected to the at least one home automation installation 17 will now be described with reference to FIG. 7. We will suppose that the monitoring method is carried out subsequently to the previously described configuration method. Thus, the low-level device models instances RD, and the generic device models instances GD are stored in an instances database IDB accessible to the execution service ES, as has been described before.

At first, the method comprises a step ESES1 of receiving a status notification message MS emitted during a step ESU1 by a central control unit U of a home automation installation 17. The status notification message MS contains an indication regarding a low-level status variable RS of a home automation device D. The message MS may contain a protocol identifier RDPT, an address of the device in the protocol RDID, an identifier of the concerned status variable RSID and the new value of the status variable RSV.

Afterwards, the method comprises a step ESES2 of determining the at least one low-level device model instance RD representing the home automation device D. In particular, this determination may be carried out by using the content of the status notification message MS and/or by identifying the emitter of this message, in this example the central control unit U.

In particular, an index key RDK already present in the message should be used, or, if this key is not present, the identification elements allowing determining this key RDK should be identified, which key will be used afterwards to select the low-level device model instance RD in the database IDB, for example in the previously described table RDTbI.

The identification elements are either explicitly contained in the notification message MS coming from the central control unit U, if this message includes dedicated fields for the identification of the source and destination entities of the message; or deduced during the reception of the notification message MS. As an example, a central control unit may be identified by: is IP address, by the TCP port number or the combination of these two elements (IP address, TCP port, that is to say the identifier of a socket for an Internet connection); or by the logical identifier of a communication channel established between the central control unit U and the server Sv. Once the low-level device model instance RD is identified, a step ESES3 of updating the low-level status variable RS in the database IDB is carried out.

A step ESES4 of converting a low-level status variable RS into one or several generic status variable(s) GS described in one or several generic device class(es) GDT is carried out afterwards. In particular, this step is performed by an invocation to the protocol driver PD which has a conversion rules database RDB comprising in particular status conversion rules SCR which allow converting a low-level status variable RS of a low-level device type RDT into one or several generic variable(s) GS1, GS2, GS3 of one or several generic devices models instance(s) GD, as has been described before, for example using the table STbI. To this end, the protocol driver performs a step of selecting a status conversion rule SCR in the conversion rules database RDB at a step ESPD4, then returns either the result of the conversion CvS of a status variable RS into one or several generic status variable(s) GS, or a rule to be executed by the execution service in order to obtain a conversion CvS corresponding to one or several generic status variable(s) GS.

A step ESES5 of determining the at least one generic device model instance GD for which the at least one status variable GS has to be updated is carried out afterwards. This determination may be based on the generic device types(s) RDT associated to the at least one generic status variable GS to be updated and on the low-level device model instance RD determined during the step ESES2.

Once the index key RDK has been determined for the low-level device model instance RD, the index key GDK, which corresponds to the identifier is easy to determine. In the case where several subsystems GD correspond to the same low-level device model instance, the information regarding the generic device type returned by the protocol driver PD allows defining the subsystem GD having to be updated.

Afterwards, the method comprises a step ESES6 of updating one or several generic status variable(s) GS on the basis of the conversion CvS determined for the generic device model instance GD determined in the database IDB.

The method may comprise a subsequent step ESES7 of restituting the updated values of the generic status variables GS toward a user Usr, on request or not of the user, who receives these values at a step ESUsr7. It is also possible to proceed to the notification of another application A executed on the server Sv which receives this notification at a step ESA7.

A method for controlling at least one home automation installation 17 of a building 1 executed by a server Sv connected to the at least one home automation installation 17 will now be described with reference to FIG. 8. For example, this method may be executed by an execution process or service ES using the functions of one or several execution driver(s) PD as described hereinabove.

At first, the method comprises a step ECES1 of receiving a generic command GC in a message MC coming from:
 i) a terminal T of a user Usr, or
 ii) an application A executed on the server Sv
emitted at a step ECUsrI or ECAI respectively and relating to a home automation device D.

A step ECES2 of determining the at least one generic device model instance GD representing the home automation device D is carried out afterwards, in particular by using the unique identifier GDURL of the generic device GD which serves as an index key and which groups together the necessary identification elements corresponding to one single generic device model instance GD. This identifier may be included in the command message MC. Once the step ECES2 is completed, the method comprises a step ECES3 of determining the at least one low-level device model instance RD corresponding to the at least one generic model instance GD determined at the previous step. The low-level device models instances RD, and the generic device models instances GD are stored in an instances database IDB accessible to the execution service ES. Thus, the steps ECES2 and ECES3 may be carried out by referring to said database IDB.

A step ECES4 of converting one or several generic command(s) GC of the at least one generic device model instance GD determined at step ECES2 into at least one low-level command RC of the low-level device model instance RD determined at step ECES3 is carried out afterwards. In particular, this step is performed by an invocation to the driver pilot PD which has a command conversion rules database according to the used types of generic device models GD and low-level device models RD. To this end, the protocol driver performs a step of selecting a conversion rule in the conversion rules database RDB at a step ECPD4, then returns a command conversion CvC corresponding to a low-level command RC to be executed or a plurality of low-level commands RC1, RC2, RC3 to be executed. Subsequently, the execution of the command may be carried out. FIG. 7 corresponds to a case where the conversion of at least one generic command GC applicable to the at least one generic device model instance GD corresponds to a plurality of low-level commands RC1, RC2, RC3, corresponding to the execution of a combination of a plurality of real commands C on the home automation device D. In such a case, the correspondence between the high-level commands GC and the associated low-level commands RC are stored in memory for an appropriate error management. In particular, the execution service ES may implement a finite-state automaton for this purpose.

Thus, at a step ECES5, a first command RC1 is sent toward the central unit U of the home automation installation 17 in order to execute the command by the device D, in a first low-level command message MRC1. In the represented example, we suppose that the feedback of this first command corresponds to a success of the command with a feedback code RRC1, sent by the central control unit U at a step ECUS. The execution service can store this success value OK for the first command RC1.

At a step ECES6, a second command RC2 is sent toward the central unit U of the home automation installation 17 in order to execute the command by the device D, in a second low-level command message MRC2. In the represented example, we suppose that the feedback of the second command corresponds to a failure of the command, with a return of a feedback code RRC2 having for example a numerical value −2 corresponding to an error, sent by the central control unit U at a step ECU6.

Subsequently, the execution service asks, at a step ECES7, for a conversion of the feedback code RRC2 into a generic feedback code GRC2 with the protocol driver PD which proceeds to this conversion at a step ECPD7. As an example, the numerical error code −2 may be translated into a generic feedback code GRC2 corresponding to an error of the type «unauthorized command». The code GRC2 is stored by the execution service ES.

At a step ECES8, a third command RC3 is sent toward the central unit U of the home automation installation 17 in order to execute the command by the home automation device D, in a third low-level command message MRC3. In the represented example, we suppose that the feedback of the third command corresponds to a failure of the command, with a return of a code RRC3 having for example a numerical value −7, sent by the central control unit U at a step ECU8.

Subsequently, the execution service asks, at a step ECES9, for a conversion of the feedback code RRC3 into a generic feedback code GRC3 with the protocol driver PD which proceeds to this conversion at a step ECPD9. As an example, the numerical error code −2 may be translated into a generic error code GRC3 «no radio response». The code GRC3 is stored by the execution service ES.

At a last step ECES10, the execution service defines a response to return to the user subsequently to the command message MC, who receives it at a step ECUsrIO.

Since a command result or feedback code GERC1 has been received for each executed low-level command RC1, RC2, RC3, the results must be aggregated in order to simulate a global command result on the original generic command. In particular, the generic command is considered to be performed if all the low-level commands have been successfully completed, and non-performed if one or several low-level command(s) have failed.

In the case illustrated in FIG. 7, it may be considered that the command GC has failed, and that the feedback code given to the client should be: «unauthorized command» and «no radio response».

This response is communicated to the user Usr or to the application A who/which receives it at a step ECUsrIO.

It should be noted that the control method can enable the parallel piloting of several products using the same protocol or different local communication protocols.

In particular, it is possible in this case to apply the following steps:
- the low-level commands RC applicable to a home automation device D having no functional subsets are executed sequentially as previously described, that is to say that a new command is sent only after the reception of the feedback code corresponding to the execution of the previous command,
- the commands relating to home automation devices D comprising functional subsets or to a group of home automation devices may be carried out in parallel, that is to say that the different commands are sent one by one, but without waiting for the reception of the feedback code corresponding to the execution of the previously sent commands, as long as these commands do not concern the same functional subset or the same device in the context of a group, which recurs to an operation corresponding to command queues for each device or for each functional subset of the home automation device D.

These arrangements allow parallelizing the processing of the commands on distinct devices or on functional subsets of the same home automation device, so as to reduce the processing time of generic commands intended to several distinct home automation devices or to functional subsets of the same home automation device.

These arrangements are particularly adapted to follow up long commands. As an example, consider a set of home automation devices formed by a set of 10 rolling shutters communicating according to a bidirectional protocol, for example of the type io-Homecontrol communicating in return an information on reaching the desired position, each shutter being capable of going through the desired stroke in 30 seconds. A sequential processing will cause a completion of the command in 5 minutes, whereas a parallel processing will enable a completion of the command and a feedback within 30 seconds.

The invention claimed is:

1. A method for configuring at least one home automation installation of a building, the home automation installation comprising a central control unit and a plurality of home automation devices, each home automation device being represented by at least one generic device model instance and at least one low-level device model instance, a first home automation device belonging to the plurality of home automation devices being able to communicate with the central control unit according to a first local communication protocol and a second home automation device belonging to the plurality of home automation devices being able to communicate with the central control unit according to a second local communication protocol different from the first local communication protocol; the method being executed by a management unit connected to the at least one home automation installation and comprising the following steps:

i. reception of a first configuration message emitted from the central control unit or a user terminal, the first communication message containing an indication on a commissioning, a configuration or a reconfiguration of the first home automation device;

ii. determination of at least one first low-level device model class or type corresponding to the first home automation device, the at least one first low-level device model class or type defining a first set of commands or functions associated to the at least one first low-level device model class or type according to the first local communication protocol;

iii. creation, according to the at least one first low-level device model class or type determined at step ii, of at least one first low-level device model instance depending on the first local communication protocol;

iv. determination of a first model conversion converting a-the at least one first low-level device model class or type into at least one first generic device model class or type on the basis of a first model conversion rule selected according to the at least one first low-level device model instance created at step iii or to the at least one first low-level device class or type determined at step ii;

v. creation of at least one first generic device model instance for the at least one first low-level device model instance on the basis of the at least one first generic device model class or type corresponding to the first model conversion determined at step iv, the at least one first generic device model instance defining a first set of commands or functions associated to the at least one first generic device model instance, the at least one first generic device model instance being independent of the first local communication protocol;

vi. reception of a second configuration message emitted from the central control unit or a user terminal, the second configuration message containing an indication on a commissioning, a configuration or a reconfiguration of the second home automation device;

vii. determination of at least one second low-level device model class or type corresponding to the second home automation device, the at least one second low-level device model class or type defining a second set of commands or functions associated to the at least one second low-level device model class or type according to the second local communication protocol;

viii. creation, according to the at least one second low-level device model class or type determined at step vii, of at least one second low-level device model instance depending on the second local communication protocol;

ix. determination of a second model conversion converting the at least one second low-level device model class or type into at least one second generic device model class or type on the basis of a second model conversion rule selected according to the at least one second low-level device model instance created at step viii or to the at least one second low-level device class or type determined at step vii; and x. creation of at least one second generic device model instance for the at least one second low-level device model instance on the basis of the at least one second generic device model class or type corresponding to the second model conversion determined at step ix, the at least one second generic device model instance defining a second set of commands or functions associated to the at least one second generic device model instance, the at least one second generic device model instance being independent of the second local communication protocol.

2. The method according to claim 1, further comprising the following step:

emission of a message for communicating the configuration of at least one of the first home automation device and the second home automation device toward a user terminal or an application executed on the management unit or on another connected management unit.

3. The method according to claim 1, wherein at least one of the at least one first generic device model instance and at least one second generic device model instance corresponds to a group of generic device models instances.

4. The method according to claim 1, wherein the at least one first generic device model instance created at step v includes a first generic device unique identifier and the at least one second generic device model instance created at step x includes a second generic device unique identifier.

5. The method according to claim 4, wherein the first generic device unique identifier comprises a first device logical address which establishes a correspondence between the at least one first generic device model instance and the at least one first low-level device model instance, and wherein the second generic device unique identifier comprises a second device logical address which establishes a correspondence between the at least one second generic device model instance and the at least one second low-level device model instance.

* * * * *